United States Patent [19]

Schnur et al.

[11] 3,769,577
[45] Oct. 30, 1973

[54] ELECTRONIC LEAKAGE RESISTANCE DETECTOR FOR AN AC CONTROL CIRCUIT

[75] Inventors: Earl J. Schnur, Lake Orion; David A. Kamulski, Detroit, both of Mich.

[73] Assignee: Westinghouse Electric Corporation, Pittsburgh, Pa.

[22] Filed: Feb. 11, 1971

[21] Appl. No.: 114,503

[52] U.S. Cl. ............... 324/51, 324/133, 340/248 C
[51] Int. Cl. ........................................... G01r 31/02
[58] Field of Search ................... 324/51, 133, 72.5, 324/140; 340/248 A, 248 B, 248 C, 255; 307/235; 328/117; 317/18

[56] References Cited
UNITED STATES PATENTS

| | | | |
|---|---|---|---|
| 3,341,816 | 9/1967 | Davis et al. | 324/140 R UX |
| 3,213,369 | 10/1965 | McAuliffe | 328/117 X |
| 3,629,816 | 12/1971 | Gillund | 324/51 |
| 3,021,514 | 2/1962 | Regis et al. | 324/133 X |
| 3,293,630 | 12/1966 | McKaig | 340/248 C |
| 3,525,939 | 8/1970 | Cartmell | 324/133 |
| 3,159,825 | 12/1964 | Bianchi et al. | 340/248 A |
| 3,354,448 | 11/1967 | Brolin | 340/248 C |
| 3,341,816 | 9/1967 | Davis et al. | 340/248 A X |
| 3,417,293 | 12/1968 | Peaslee et al. | 324/133 UX |
| 3,122,729 | 2/1964 | Bothwell et al. | 340/248 |

*Primary Examiner*—Gerard R. Strecker
*Attorney*—A. T. Stratton and Clement L. McHale

[57] ABSTRACT

An electronic leakage detector electrically connected across an AC control circuit component and responsive to a preselected range of AC voltages across the component to indicate the presence of leakage resistance paths in the control circuitry. The detector comprises a converter which monitors the AC voltage across the component to provide a DC signal which varies in accordance with the magnitude of the AC input and an electronic logic circuit responsive to a range of DC signals to indicate when the AC voltage is within the preselected range. The leakage detector is physically compact and in no way impairs the conventional operation of the control circuitry to which it is connected.

2 Claims, 1 Drawing Figure

PATENTED OCT 30 1973
3,769,577
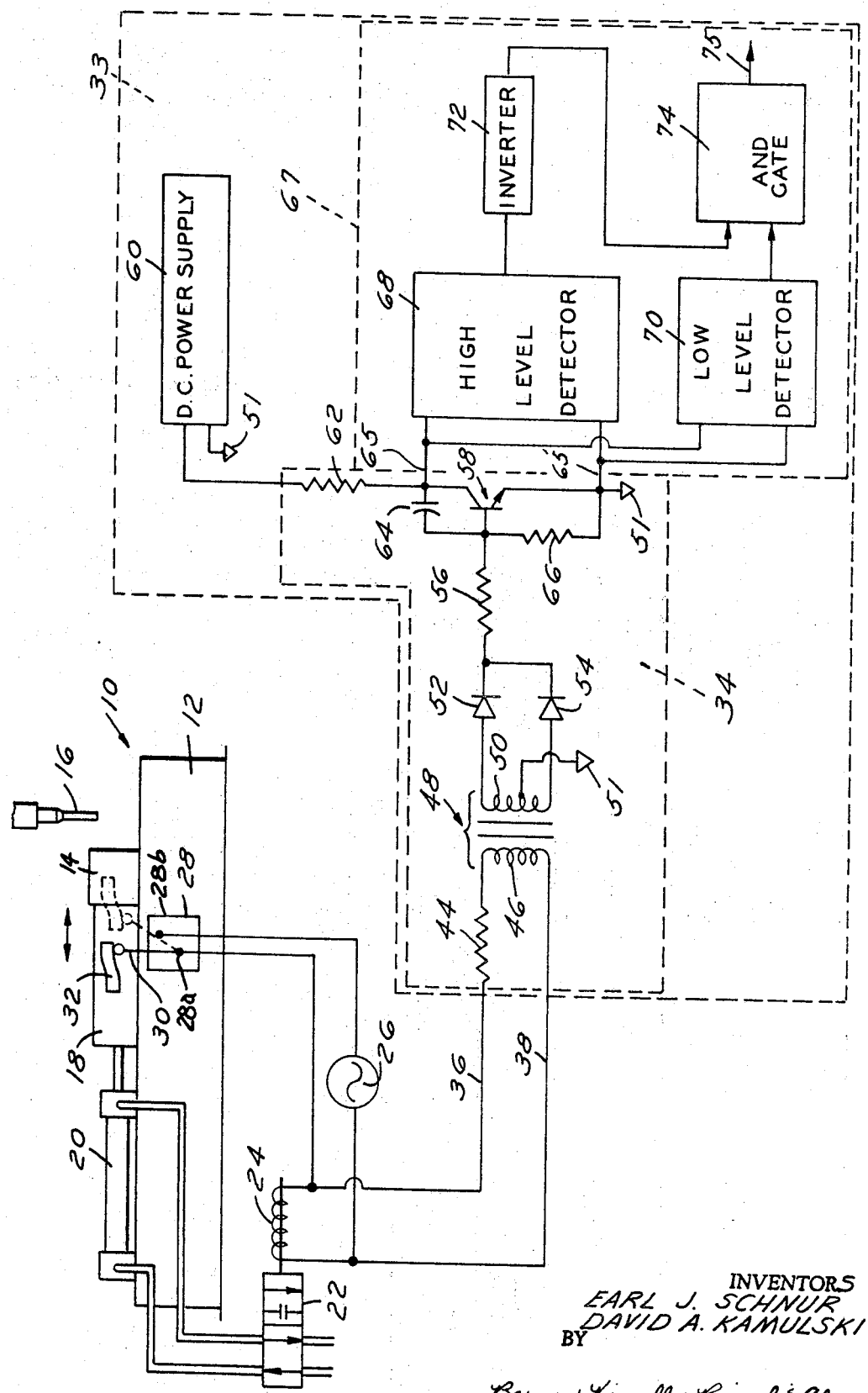
INVENTORS
EARL J. SCHNUR
DAVID A. KAMULSKI
BY
Barnes, Kisselle, Raisch & Choate
ATTORNEYS

ELECTRONIC LEAKAGE RESISTANCE DETECTOR FOR AN AC CONTROL CIRCUIT

This invention relates to leakage detectors for AC control circuits and more specifically to an electronic circuit for detecting the presence of spurious AC voltages across AC control components which are caused by formation of leakage resistance paths somewhere in the control circuitry. The improved leakage detector of this invention indicates the formation of these leakage paths in their incipiency so that they may be eliminated before they become troublesome.

Generally such leakage paths are caused by a gradual accumulation of electrically conductive contaminants on various electrical components such as are used in machine tool circuitry. During the early stages of contamination the problem is not readily apparent because the leakage resistance is very large. However, continued accumulation reduces the leakage resistance and the problem becomes more critical. As the leakage resistance decreases, partial short circuits occur which can cause a control component to operate spuriously. For example, an accumulation of contaminant between a terminal of a limit switch and the grounded limit switch cover can form a leakage resistance path to ground thereby partially shorting out the switch. Thus, even when the switch is open the device which it controls is susceptible to spurious actuation. Normally a control component does not respond until the voltage applied to it reaches an appreciable level. However, to prevent a control malfunction because of leakage resistance, it is necessary to detect spurious voltages before they reach this appreciable level.

In the past, leakage paths have been usually detected by directly measuring leakage resistance. While such an approach can be satisfactory, it is at best an indirect method of indicating the actual problem, namely the presence of spurious AC voltage across the electrical component. A more direct method for solving this problem is to continuously monitor the voltage across the control component to indicate when the leakage reaches a dangerous level. However, because full line voltage is applied to the control component when it is being actuated, the apparatus for monitoring the voltage across the component must discriminate against this condition.

Accordingly an important object of this invention is the provision of an improved leakage detector for AC control circuitry which monitors the voltage across an electrical circuit component and which is responsive to a limited range of voltages to indicate the presence of leakage resistance in the control circuitry.

It is another object of the invention to provide an improved electronic leakage detector for AC circuitry which responds to varying levels of AC leakage voltage to provide varying levels of DC output voltage which are logically processed by electronic logic elements to indicate when the leakage voltage lies within a predetermined leakage range to thereby indicate leakage resistance in the control circuitry.

Likewise, it is an object of the invention to provide an improved electronic leakage detector for AC circuitry which is inexpensive to manufacture, is highly reliable and occupies a small amount of space.

Other objects and features of the invention will be apparent in the specification and the drawing which shows the electrical schematic diagram of the electronic leakage detector of the present invention connected to a portion of the AC control circuitry of a machine tool.

Referring now to the drawing, a machine tool 10 comprises a base 12 along which a workpiece 14 is being horizontally moved toward a cutter 16 by means of a ram 18. Ram 18 is driven by a power cylinder 20 which is hydraulically connected to a valve 22 which is in turn actuated by the application of voltage to a solenoid 24. Solenoid 24 is electrically connected in series circuit with an AC power supply 26 and a normally open limit switch 28 which is mounted on base 12. The actuating lever 30 of limit switch 28 is positioned to be tripped by a cam 32 on ram 18 such that switch 28 is closed when the ram is at one limit of travel. Closure of switch 28 causes solenoid 24 to be energized by power supply 26. As a result, valve 22 is shifted to thereby arrest the movement of ram 18.

The leakage detector 33 of the present invention is connected by input leads 36 and 38 directly across solenoid 24. Leakage detector 33 comprises an AC-DC converter 34 which is in turn connected to a logic section 67. Logic section 67 comprises in part a high level detector 68 and a low level detector 70 which are connected in parallel fashion to the output of converter 34 by lines 65 and 65'. In turn the output of detector 68 is supplied through a logic inverter 72 to one input terminal of an and-gate 74. The output of detector 70 is supplied directly to the other input terminal of gate 74. The output 75 of gate 74 indicates when leakage in the AC circuit has reached a predetermined level.

The input circuit of converter 34 comprises a resistor 44 and the primary coil 36 of a transformer 48. The secondary 50 of transformer 48, whose center tap is connected to DC common 51, is connected through two diodes 52 and 54 whose cathodes are tied together at one terminal of a resistor 56. The other terminal of resistor 56 is connected to the base of a transistor 58. The emitter of transistor 58 is connected to DC common 51 and its collector is supplied from a DC power supply 60 through a resistor 62. In addition, the base of transistor 58 is connected to its collector and to its emitter by a capacitor 64 and a resistor 66, respectively. The output of converter 34 is taken across the collector and emitter of transistor 58 and is supplied along lines 65 and 65' to detectors 68 and 70 as previously indicated.

The operation of leakage detector 33 is now described for each of three operating conditions; namely, (1) when limit switch 28 is open and there is no leakage in the control circuitry, (2) when switch 28 is closed so as to apply full line voltage across solenoid 24, and (3) when limit switch 28 is open and there is leakage in the control circuitry within the range to which the leakage detector is responsive. The operation of converter 34 is first set forth and the response of logic section 67 to the operation of converter 34 will be subsequently considered.

In the first condition, since there is no voltage input to converter 34, the output voltage thereof is determined by the circuitry connected to transistor 58 comprising resistors 62 and 66, capacitor 64 and power supply 60. The values of these components are such that capacitor 64 becomes charged to the same voltage as that of supply 60 and in this state operates to maintain transistor 58 non-conducting. With transistor 58 non-conducting, the output voltage of converter 34 is essentially equal to the voltage of supply 60. This condition remains stable until the second condition occurs, that is, the closure of switch 28.

With the AC voltage of source 26 applied to the input circuitry of converter 34, a series of single polarity pulses is applied through resistor 56 to the base of transistor 58. The magnitude of the pulses is controlled by resistor 44. The single polarity feature of these pulses is obtained by using the rectifying connection of diodes 52 and 54 to transformer secondary 50. For example, if 110 VAC 60 CPS is supplied to converter 34 then pulses of alternating polarity are supplied to primary 46 at a rate of 120 pulses per second. Increasing the resistance of resistor 44 causes the alternating pulses to decrease in amplitude and vice versa, but does not change the pulse repetition rate.

The appearance of the pulses at the base of transistor 58 biases the transistor for conduction. As a result, collector current is simultaneously drawn from capacitor 64 directly and from source 60 through resistor 62. Because a controlled impedance path is now present through the collector-emitter circuit of transistor 58, capacitor 64 which in part controls the fall rate of the collector voltage discharges at a predetermined rate. Consequently, the output of converter 34 falls to a low voltage level. While the current available from the first pulse may be sufficient to completely discharge capacitor 64, it should be appreciated that several pulses may be required depending upon the values of resistors 56 and 66 in relation to the amplitude of the rectified voltage pulse at the cathodes of diodes 52 and 54. As long as pulses from the input circuitry of converter 34 keep appearing at the base of transistor 58, the output voltage of converter 34 is maintained at its low level. When the pulses disappear, transistor 58 still remains temporarily biased for conduction but for a different reason. Immediately upon the disappearance of the pulses, the series circuit path comprising resistor 62, capacitor 64 and resistor 66 begins drawing current from source 60 to start re-charging capacitor 64. This current produces a sufficient voltage drop across resistor 66 to temporarily maintain transistor 58 in the conducting state. However, when capacitor 64 once again becomes fully charged, transistor 58 is rendered nonconducting and the output of converter 34 returns to the high voltage level.

Turning now to the third situation, because of leakage in the AC circuit, the voltage across solenoid 24 lies somewhere in the range to which leakage detector 33 is constructed to respond to indicate a leakage condition. For example, such a leakage condition can occur when contaminants have accumulated between contact 28a of limit switch 28 and the grounded limit switch cover 28b. Voltages which are in the range of approximately 20 percent to approximately 70 percent of the full line voltage comprise a suitable range. The 20 percent figure is sufficiently high to indicate an incipient leakage problem, yet sufficiently low to prevent spurious operation of the circuit component. The 70 percent figure is sufficiently high to provide a wide leakage response range, yet sufficiently low so that variations in full line voltage do not provide a false indication of a non-leakage condition. In this fashion the leakage detector discriminates against the normal operating condition when full line voltage is applied to the circuit component.

Generally converter 34 provides a DC output voltage whose level varies inversely in accordance with the level of voltage across solenoid 24. More specifically, when no AC voltage is being applied to converter 34, transistor 58 is non-conducting and the output of converter 34 is maintained at a high voltage level substantially identical to the voltage of power supply 60. As the amplitude of the AC input to converter 34 increases, the voltage output of converter 34 decreases. When the full line voltage is applied to converter 34, the output is at a low, almost zero, voltage. Thus, when the voltage across solenoid 24 is equal to approximately 20 percent of full line voltage, the output of converter 34 is at a first signal voltage level between the high and low voltage levels. When the voltage across solenoid 24 is equal to approximately 70 percent of full line voltage, the output of converter 34 is at a second signal voltage level significantly lower than the first signal voltage level but still between the aforementioned high and low voltage levels.

Describing now the operation of logic section 67 in response to the output of converter 34, level detector 70 is a conventional logic element which is repsonsive, that is provides a logical output signal, whenever the output voltage of converter 34 is less than the first signal voltage level. Hence, the presence of a logical output signal at the output of detector 70 indicates that at least 20 percent of full line voltage is appearing across solenoid 24. Level detector 68 provides a logical output whenever the output voltage of converter 34 is less than the second signal voltage level. However, the output of detector 68 is logically inverted by inverter 72 and consequently inverter 72 provides a logical output signal whenever the voltage across solenoid 24 is less than 70 percent of full line voltage. Because and-gate 74 is responsive only to the concurrence of signals from detector 70 and inverter 72, a leakage indication output therefrom occurs only when the voltage across solenoid 24 is between 20 percent and 70 percent of full line voltage.

Therefore, leakage detector 33 successfully discriminates against the proper operation of AC control circuitry to respond only when there is a spurious voltage across solenoid 24 of from 20 percent to 70 percent of full line voltage to thereby indicate a leakage condition. It should be pointed out that whereas during normal switching of solenoid 24 the applied voltage passes through this 20 percent to 70 percent range, the duration of voltage within this range is so short that detector 33 cannot respond to it. It should be appreciated that this range may be varied accordingly by varying the parameters of the detector circuitry. Similarly, the disclosed construction of detector 33 may be modified in various fashions to provide identical operation. For example, converter 34 could be constructed to provide an increasing output voltage in response to an increasing AC input voltage with corresponding changes being made in logic section 67. Moreover, the shape of the pulses applied to transistor 58 may be varied by substitution of different components in the input circuitry of converter 34, and the values of resistors 62 and 66 and capacitor 64 may be modified to respond to the new pulse characteristics so that basic operation of converter 34 is unchanged. It should also be appreciated that the logic elements of logic section 67 are conventional and may be readily constructed in any suitable manner as would be known to one skilled in the art.

By way of example, the following components have been successfully employed in converter 34:

| | |
|---|---|
| resistor 44 | 33 kohms |
| diodes 52, 54 | 1N914B |
| resistor 56 | 47 ohms |
| transistor 58 | 2N3643 |
| power supply 60 | +24 VDC |
| resistor 62 | 2.7 kohms |
| capacitor 64 | 1 micro fd. |
| resistor 66 | 680 ohms |
| transformer 48 | Better Coil and Transformer Corp. Model No. 8317023 |

The use of these specific components is intended to be merely exemplary to set forth a specific functional embodiment which has been successfully operated.

We claim:

1. In a leakage detector for AC control circuitry of the type comprising an electrical component selectively operable by connection to a power source of predetermined AC voltage, the combination comprising input circuit means connected across said component for receiving an AC input voltage, converter means electrically connected to said input circuit means for providing a DC output signal whose voltage level varies in accordance with the level of the AC input voltage and electronic logic means electrically connected to said converter means and being responsive to a preselected range of the DC output signal whenever the magnitude thereof is greater than zero and less than the predetermined voltage value of said power source for providing a leakage signal whenever the DC output signal is within said preselected range for a predetermined minimum period of time, said preselected range being defined by first and second DC output signal levels corresponding to first and second levels of the AC input voltage respectively, said electronic logic means comprising first and second detector means responsive to said first and second output signal levels respectively, means for logically inverting the output of one of said detector means and means responsive to the coincidence of the output of said inverter means and the output of the other of said detector means for indicating when the AC input signal is between said first and second levels for a predetermined minimum period of time, whereby said leakage signal is provided, said electronic logic means including electrical circuit elements which are DC logic elements only, said electronic logic means responding to said DC output signal in said range if said DC output signal resides in said range continuously for a period of time greater than said predetermined minimum value to provide said leakage signal, and not responding to said DC output signal in said range if said DC output signal resides in said range continuously for a period of time less than said predetermined minimum value, during which lesser time period voltages resulting from normal operation of the control circuitry may occur.

2. The detector called for in claim 1 wherein said first and second levels of the AC input voltage are approximately 20 percent and 70 percent respectively of the predetermined voltage of the power source.

* * * * *